United States Patent Office 3,057,944
Patented Oct. 9, 1962

---

3,057,944
ELECTRIC BATTERY
Paul Ruetschi, Glenside, Boris D. Cahan, Philadelphia, and William Stanley Herbert, Morrisville, Pa., assignors to The Electric Storage Battery Company, a corporation of New Jersey
No Drawing. Filed Dec. 21, 1959, Ser. No. 860,681
3 Claims. (Cl. 136—20)

The present invention generally relates to alkaline batteries of the type utilizing silver positive electrodes. More specifically, the present invention is concerned with an additive for batteries of the type described which improves the performance thereof.

Silver electrodes are widely used in both primary and secondary batteries. It has long been known, however, that the divalent oxide of silver, AgO, evolves oxygen when it is in contact with aqueous solutions of alkaline electrolytes and that this undesirable effect increases with increasing temperature. Since it is often desirable to hermetically seal alkaline batteries to prevent a reaction between the electrolyte and carbon dioxide in the atmosphere, to prevent electrolyte leakage, and to prevent the evaporation of water from the electrolyte, the gassing of divalent silver oxide creates a serious problem. For example, it has been found, that unless the tendency of divalent silver oxide to gas in alkaline electrolytes is inhibited that it is impossible to seal certain types of cells without causing a buildup of pressure within such cells that can result in a violent rupture of the cell casings. In addition, the gassing of divalent silver oxide represents a self-discharge of the positive electrode, and hence a loss in cell capacity.

It is therefore an object of the present invention to provide a means in the form of an additive which will reduce the gassing of divalent silver oxide in alkaline electrolytes.

It is another object of the present invention to provide an additive for batteries of the type described which is particularly adapted to facilitate their operation in the sealed condition.

In accordance with the present invention, there is added either to the electrolyte or to the silver electrode itself a chemical compound which has or is capable of forming in situ a polar chemical group which can attach itself to the surface of the silver oxide particles with the remainder of the molecule being hydrophobic in nature to hinder contact with the electrolyte. Such compounds are generally classed as heteropolar surface active substance. More specifically, a surface active heteropolar substance within the scope of the present invention is one which has a molecule in which the surface active group is selected from the group consisting of mercaptans, alcohols, aldehydes, ketones, carboxylic acids, ethers, thioethers, sulfides and amines and in which the hydrophobic part of the molecule is selected from the group consisting of aromatic, alicylic, heterocyclic and aliphatic groups.

While the mechanism which causes the substances described above to function as gassing inhibitors is not fully understood, it is believed that they function as a result of one or more of the following reactions: by means of an adsorption and orientation which repels electrolyte; the reduction of a surface layer of divalent silver oxide to monovalent silver oxide; the formation of a film of an insoluble silver compound; or by the formation of some other type of physical or chemical coating on the silver oxide particles which minimizes contact with the electrolyte.

Other objects and advantages of the present invention will be readily apparent from the following detailed description of preferred embodiments thereof.

In carrying out the present invention, a heteropolar surface active compound is added to a formed silver electrode, as hereinafter described, in an amount ranging from about 0.001 gram to about 0.2 gram per gram of silver in the electrode. The addition may be made to electrodes adapted for use in either primary or secondary type batteries. Thus, as those skilled in the art will understand, the treated electrode may comprise of sintered silver plaque, silver bound in a porous plastic matrix, or a pressed silver electrode in the case of a secondary battery, or a compressed pellet of divalent silver oxide or a pasted silver plaque in the case of a primary cell, to mention but a few of the applicable constructions.

A heteropolar surface active ingredient suitable for use in accordance with the present invention is one having a molecular structure such that one end of the molecule is hydrophobic in nature and is selected from the group consisting of aromatic alicylic, heterocyclic and aliphatic chains and the other end of the molecule consists of a surface active group selected from the group consisting of: —SH, —OH,

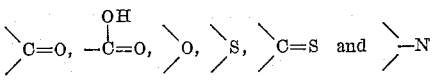

Thus, the surface active agents which provide compounds suitable for use as additives for reducing the gassing of divalent silver oxide in alkaline electrolytes are mercaptans (R—SH), alcohols and phenols (R—OH), aldehydes and ketones

carboxylic acids

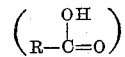

ethers

thioethers and sulfides

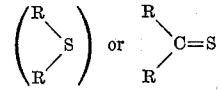

and amines

It should be noted that some surface active heteropolar compounds can be very large molecules having a multiplicity of surface active groups and a multiplicity of hydrophobic groups. In these cases all of the surface active groups must be at one end of the molecule and all of the hydrophobic groups must be at the other end of the molecule such that the overall heteropolarity is preserved. An example of such a large heteropolar surface active molecule is that available commercially under the trade name "Pluronic L-64" which is a condensation product of ethylene oxide with polypropylene oxide and polypropylene glycol. It should also be noted that the definition of a heteropolar surface active compound given above excludes the case where a surface active group is shielded by two or more large hydrophobic groups in such a manner as to prevent proper adsorption of the surface active group. In other words, there should be no steric hindrance for the adsorption of such molecules.

By way of illustration and not by way of limitation b-phenylethylalcohol ($C_6A_5$—$CH_2$—OH) is an example of an alcohol and phenol which has been found to inhibit the gassing of divalent silver oxide. Anisaldehyde $$(CH_3O—C_6H_4—CHO)$$

and methyl-nonylketone $(CH_3—CO—C_9H_{19})$ are examples of an aldehyde and a ketone respectively which make excellent additives. Continuing with examples of additives in accordance with the present invention, methyl-nonyl-ether $(CH_3—O—C_9H_{19})$ is illustrative of a suitable ether compound. Some suitable thioethers, sulfides and mercaptans are dimethyl-sulfide $$(CH_3—S—CH_3)$$

sodium xanthoginate $(CH_5O—CS—SNa)$ and mercaptoethanol $(HO—CH_2—CH_2—SH)$. An example of an amine which has been found to be effective is p-aminophenol $(NH_2—C_6H_4—OH)$. Examples of additives which will develop strong heteropolarity as a result of an in situ chemical alteration are tetrahydronaphthaline $(C_{10}H_{12})$ and methylanisate $(CH_3—O—(C_6H_4)—COOCH_3)$.

There are several methods by which the heteropolar surface active compounds of the present invention may be added to an electrode. The simplest method of addition is by direct addition of the compound to the battery electrolyte where the compound is soluble in the electrolyte. This method of addition is, of course, impractical where the compound is insoluble or only slightly soluble in electrolyte. For insoluble or slightly soluble compounds, it has been found practical to provide a dilute solution of the compound and a suitable organic solvent, such as acetone or carbon tetrachloride. The electrode to be treated is then immersed in the solution until the solution thoroughly penetrates the pores of the electrode. The electrode is next removed from the solution and the solvent allowed to evaporate, leaving a deposit of the compound on the active material particles of the electrode.

As stated hereinbefore, best results have been found when the additives are present in amounts ranging from about 0.001 gram to about 0.2 gram per gram of silver in the electrode. With respect to the upper limit of about 0.2 gram of additive per gram of silver, it should be noted that this amount represents the point at which the benefits due to gas reduction begins to be offset by the disadvantage of displacing active material and/or electrolyte. Thus, it should be understood that where electrode capacity can be sacrificed a larger amount of an additive may be utilized. The lower limit of 0.001 gram of additives per gram of silver in the electrode is determined by the requirement that the true surface of the active material should be substantially covered with the additive. It should be understood, however, that each of the individual additives which meet the definition given hereinbefore has an optimum range within the specific preferred limits of from about 0.001 gram to about 0.2 gram per gram of silver.

As has been stated hereinbefore the mechanism by which heteropolar surface active compounds function to inhibit the gassing of divalent silver oxide in alkaline electrolyte is not fully understood. It is believed, however, that surface active compounds of the type described are probably effective because the surface active end of the molecule reacts with or attaches itself to the silver oxide surface leaving the hydrophobic end of the molecule oriented towards the solution to repel the electrolyte. These adsorbed surface films do not markedly interfere with discharge of an electrode because they break down as the discharge reaction proceeds and can, in special cases, reform when discharge is interrupted.

In addition to being surface active, as defined hereinbefore, some of the compounds are reducing agents and hence, at least part of the mechanism responsible for the reduction of gassing by these compounds consists of the electrolytic or chemical reduction of the sharp ridges and points or other sites of oxygen evolution. Certain sub-groups of the broad category of compounds which have been found applicable function to inhibit gassing by other combinations of mechanisms. For example, in addition to functioning as reducing agents, certain of the applicable aromatic aldehydes, such as p-hydroxy-benzaldehyde and o-anisaldehyde are believed to be adsorbed on the surface of the silver particles and by oxidation and polymerization form a protective film on the divalent silver oxide particles preventing a reaction between the silver oxide and the electrolyte until discharge. By way of further illustration of dual mechanisms by which additives reduce the gassing of divalent silver oxide, certain sulfur compounds, in addition to being surface active may form insoluble compounds with the silver ions which passivate the surface of the divalent silver oxide particles with an insoluble film.

In order to determine the effectiveness of additives in accordance with the present invention, tests were conducted under controlled conditions to measure the oxygen evolved from divalent silver oxide in an alkaline electrolyte with additives present. Specifically, the tests were carried out by measuring the gas evolved over a period of six and one-half days by 0.3 gram pellets of divalent silver oxide in 10 cc. of electrolyte kept at a constant temperature of 45° C. The electrolyte utilized comprised a solution of 48 grams of sodium hydroxide and 10 grams of zinc oxide dissolved in 100 milliliters of distilled water. In each test but the control, the additive was present in an amount of 0.03 gram per gram of divalent silver oxide. The results of these tests are summarized in Table I.

*Table I*

| Additive: | Cc. of oxygen evolved per gram of AgO |
|---|---|
| None (control) | +0.734 |
| p-Amino-phenol | −0.332 |
| Methyl-nonyl-ketone | −0.70 |
| Pluronic L-64 | −0.036 |
| O-anisaldehyde | −0.035 |
| Salicylaldehyde | −0.027 |
| Demethyl-sulfide | −0.014 |
| p-Hydroxy-benzaldehyde | +0.032 |
| Mercaptoethanol | +0.217 |
| Anisic acid | +0.195 |
| Sodium citrate | +0.623 |
| Sodium tartrate | +0.678 |

As shown, the control, that is where no additive was present, the divalent silver oxide evolved 0.734 cc. of oxygen. The addition of p-amino-phenol, methyl-nonyl-ketone, Pluronic L-64, o-anisaldehyde, salicylaldehyde and dimethyl-sulfide not only prevented the evolution of oxygen, but as can be seen by the negative sign, also furnished to absorb small amounts of oxygen. These additives can be classified as extremely effective. The addition of p-hydroxy-benzaldehyde, mercaptoethanol, and anisic acid effectively inhibited almost all oxygen evolution but did not absorb any oxygen. These specific additives are considered to be moderately effective. The addition of sodium citrate and sodium tartrate slightly inhibited the evolution of oxygen at the extreme conditions under which the tests were carried out. In this respect, it should be noted that all of the additives for which test results are summarized in Table I function more effectively under less extreme conditions of temperature.

It is felt that the specific additives tested are illustrative of similar compounds which meet the definition of an additive in accordance with the present invention. From the results of these tests, it can be seen that each of the additives function to inhibit oxygen evolution and hence their addition to a battery having silver electrodes will facilitate the operation of such cells in a sealed condition.

Having described the present invention, what is claimed as new is:

1. A silver battery electrode including, in an amount of from about 0.001 gram to about 0.2 gram per gram of silver, a surface active heteropolar compound having a molecular structure such that one end of the molecule is hydrophobic in nature and is selected from the group consisting of aromatic alicylic, heterocyclic and aliphatic groups and the other end of the molecule consists of a surface active group having no more than ten carbon atoms selected from the group consisting of

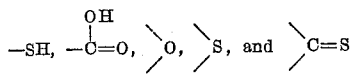

2. A battery electrode active material comprising divalent silver oxide and an amount of from about 0.001 gram to about 0.2 gram per gram of silver of a surface active heteropolar compound having a molecular structure such that one end of the molecule is hydrophobic in nature and is selected from the group consisting of aromatic, alicylic, heterocyclic and aliphatic groups and the other end of the molecule consists of a surface active group selected from the group having no more than ten carbon atoms consisting of

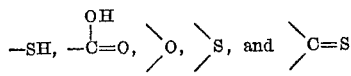

said surface active heteropolar compound being effective to inhibit the gassing of said silver oxide in alkaline electrolytes.

3. A method for reducing the gassing of an electrode having an active material including divalent silver oxide in alkaline electrolytes which comprises the addition to said electrolytes of from about 0.001 gram to about 0.2 gram per gram of silver of a surface active heteropolar compound having a molecular structure such that one end of the molecule is hydrophobic in nature and is selected from the group consisting of aromatic, alicylic, heterocyclic and aliphatic groups and the other end of the molecule consists of a surface active group selected from the group having no more than ten carbon atoms consisting of

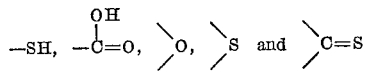

References Cited in the file of this patent
UNITED STATES PATENTS

| | | |
|---|---|---|
| 2,063,524 | Ruben | Dec. 8, 1936 |
| 2,428,850 | Lawson | Oct. 14, 1947 |
| 2,795,638 | Fischback | June 11, 1957 |
| 2,887,522 | Mackenzie | May 19, 1959 |
| 2,960,558 | Marsal et al. | Nov. 15, 1960 |
| 2,960,559 | Magill et al. | Nov. 15, 1960 |